United States Patent [19]
Salyer et al.

[11] 3,746,014
[45] July 17, 1973

[54] CIGARETTE FILTER

[75] Inventors: Ival O. Salyer, Dayton; Robert T. Jefferson, West Carrollton, both of Ohio

[73] Assignee: Monsanto Research Corporation, St. Louis, Mo.

[22] Filed: May 4, 1971

[21] Appl. No.: 140,286

[52] U.S. Cl. .............................. 131/269, 131/10 R
[51] Int. Cl. ............................................ A24b 15/02
[58] Field of Search ................. 131/267, 269, 10 R, 131/261

[56] References Cited
UNITED STATES PATENTS

| | | | |
|---|---|---|---|
| 3,574,150 | 4/1971 | Jefferson et al. | 260/2.5 |
| 3,006,346 | 10/1961 | Golding | 131/269 X |
| 2,893,402 | 7/1959 | Pinsuti | 131/269 |
| 3,358,695 | 12/1967 | Blakey et al. | 131/269 |

*Primary Examiner*—Robert W. Michell
*Assistant Examiner*—George M. Yahwak
*Attorney*—Frank D. Shearin and L. Bruce Stevens, Jr.

[57] ABSTRACT

An open-pore polyurethane having a porosity of at least 50 percent and a density of from 0.1 to 0.5 grams per cubic centimeter was found to be particularly effective as a smoke filter for tobacco products. The polyurethane contains coherent spherical particles of less than 10 microns diameter which are separated by interconnecting interstices.

10 Claims, No Drawings

CIGARETTE FILTER

BACKGROUND OF THE INVENTION

1. Field of the Invention

This invention relates to the filtration of gases, and more particularly, it is concerned with the manufacture of improved smoke filters for tobacco products such as cigarettes.

2. Description of the Prior Art

Previously, porous polyurethane structures have been obtained as polyurethane foams whose preparation and chemistry are well summarized in the book by J. H. Saunders and K. C. Krisch, "Polyurethanes," Interscience Publishers, John Wiley and Sons, N.Y., 1962. Briefly, they are produced by reacting an organic diisocyanate with organic compounds having at least two active hydrogens, e.g., organic acids, amines, hydroxy compounds including glycols, and polyhydroxy compounds.

The rigid polyurethane foams known to the art have been generally prepared from polyols which would afford a highly branched or cross-linked structure. The rigid foams have generally had a closed cell structure comprising interconnected dodecahedra, usually with over 90 percent closed cells having intact membranes or walls. For applications such as filters, demanding an open cell structure, such products are obviously useless since there are few interconnecting passageways. In addition, typical rigid foams have shown permanent deformation at 10 percent deflection in the stress-strain relationship, which has limited their utility in structural applications.

The open-cell prior-art rigid polyurethane foams have generally been low density and consisted of interconnected struts left from the opening up of the dodecahedral cells originally formed at the foaming or blowing stage. When the cells are opened, the walls or membranes serving as common walls for adjacent dodecahedra are blown open and the material reformed as struts.

Any number of products known to the art have been used as a smoke filter for tobacco products. Some filters are made of paper, and others of cellulose acetate fibers. Many contain a material such as charcoal between two plugs of paper or cellulose acetate. Powdered resins such as nylon have been used in this application, and one product even contains a polyurethane powder between two plugs of cellulose acetate. A filter for tobacco smoke must be able to absorb various products of combustion that results from smoking tobacco in the form of cigarettes, cigars, pipes, and the like. At the same time they must permit some of the products to pass through the filter to satisfy smokers. It can be appreciated that this balance of properties is of interest due to the growing realization of the health hazards involved in smoking, as well as the evidence of the presence of carcinogenic materials in tobacco smoke.

SUMMARY OF THE INVENTION

It is one object of the invention to provide filters for the removal of unwanted substances from gases. Another object is to provide a filter material for removing products of combustion from tobacco smoke. Yet another object is to prepare a filter material for tobacco smoke that is made of an open pore polyurethane structure.

These and other objects of the invention are achieved by a smoke filter for tobacco products which comprises an open-pore polyurethane structure having a porosity of at least 50 percent, a density of 0.1 to 0.5 grams per cubic centimeter, and further comprising coherent spherical particles of less than 10 microns diameter separated by interconnected interstices.

The open pore polyurethane of this invention is made by a method of preparing an open-pore polyurethane structure which comprises (a) preparing separate solutions of polyurethane-forming reactants comprising (1) a mixture of polyaryl polyalkylene polyisocyanates having the formula

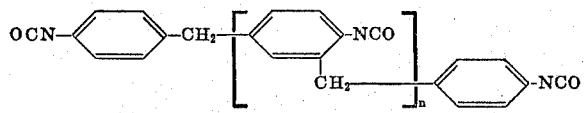

wherein $n$ has an average value of 0.5–2.0, containing about 40–50 percent diisocyanate, the balance being tri-, tetra- and pentaisocyanates, having a functionality of about 2.1–3.5 and (2) a polyol having a functionality of at least 3.0, in inert organic liquid diluents which form a homogeneous mixture in which the polyurethane produced herewith is substantially insoluble, (b) mixing the solution to yield a homogeneous mixture of the reactants having a total concentration by weight of 10–3 percent and an NCO/OH ratio of 0.90–1.20, preferably 0.90–1.05, and ceasing said mixing before the onset of gelation, (c) thereafter maintaining said mixture in a quiescent state while the polyurethane solution gels, and (d) removing said organic liquid.

By "functionality" of the polyisocyanate is meant the average number of NCO groups per molecule. The isocyanate groups are conveniently determined by the "amine equivalent" method (ASTM D-1638-67T). The hydroxyl groups of the polyol are determined by appropriate methods (ASTM D-1638-67T) and usually reported as "hydroxyl number," i.e., the number of milligrams of potassium hydroxide equivalent to the hydroxyl content of 1 gram of the sample. The NCO/OH ratio is the equivalent weight of isocyanate groups present in the polyisocyanate reactant divided by the equivalent weight of hydroxyl groups present in the polyol reactant.

By "homogeneous" is meant a mixture that is essentially uniform. This can be determined by sampling and analysis. In some instances it can be demonstrated by the absence of visible striations characteristic of poorly mixed liquids having different refractive indices. Still another test is incorporation of a dye or coloring matter in one solution and observation of the uniformity of dispersion on mixing with a second solution.

By "gelation" is meant the change of state from the original usually clear solution to a gel or jelly, usually opaque. It is readily apparent as a visible phenomenon or may be detected by suitable viscosity measurements on segregated portions of the mixture, as with a Brookfield rotational viscometer, whereby a sharply rising viscosity indicates the onset of gelation.

Unlike the prior art products, the open-pore polyurethane structures comprise agglomerated coherent spherical particles rather than interconnected struts left from blown dodecahedral cells as in foam products. The present structures are remarkably uniform and have a high degree of porosity and can be obtained in a density varying from 0.1 to 0.5 gram per cubic centimeter. The structures are compressible and, for compressions of less than 20 percent, give full recovery. Further the present structures may be made in a variety of pore sizes, usually less than 10 microns. Greater details on the preparation of these structures may be found in U.S. Pat. No. 3,574,150 issued Apr. 6, 1971 which is incorporated herewith by reference.

The present material offers several advantages over prior art filter materials. The structures can be cast in the proper shape of a tobacco filter. Because there is practically no shrinkage during gelation, precipitation and drying, the cast structure occupies the same volume as the homogeneous mix of reactants. The structure can be used directly as the filter without the necessity of plugs to hold the filter in place. As an example, the structure cast as a rod of the appropriate size can be rolled in cigarette paper with the tobacco to make a cigarette. Furthermore, the cast structure does not contain a nonporous outer skin, which would make it objectionable for use as a cigarette filter.

Although the material may be cast directly into the shape of the filter, other methods known to the prior art may be used to form the filter. As an example, the material may be cast into a flat sheet and the filters punched or cut from the bulk material. The filters, usually in the shape of cylindrical rods, may be machined to size from a larger piece. Thus, the method of forming the filter shape is not limited to casting.

DESCRIPTION OF THE PREFERRED EMBODIMENTS

The conditions for forming open-pore polyurethane structures are set forth in the cited U.S. Pat. No. 3,574,150, issued Apr. 6, 1971, and are incorporated herewith by reference. These include the choice of organic liquid diluent or diluents, the polyisocyanates, and the polyols; factors such as the presence of catalysts, the concentration of reactants, the NCO/OH ratio of the system, and the temperature; the necessity for a homogeneous system prior to gelation; the necessity for absence of shearing during gelation; and the possibility of altering the structure by additives, fillers, surfactants, water or pneumatogens.

Preferred polyols are selected from the reaction product of ethylene diamine and propylene oxide having a molecular weight of 274–300 and a hydroxyl number of about 750–800, and the reaction product or diethylenetriamine and propylene oxide having a molecular weight of 400–600 and a hydroxyl number of about 450–800.

The homogeneous solutions of the urethane reactants prior to gelation, containing the urethane precursors, are readily transferred to an appropriate mold to form the filter material. Unlike solutions of conventional polymers, these solutions have low viscosity and flow readily even at high concentration of the reactants. They are therefore handled easily and are adaptable to unusual shapes and structures, if necessary. The "solution time" prior to gelation is readily established by experimentation. Transfer is then made safely during the period without jeopardizing the properties of the polymer structure. Once gelation occurs the mixture must be kept in a quiescent state to insure optimum uniformity. If the material is cast as a straight tube, it is readily filled and left standing in a vertical position until gelation is complete.

Inert organic liquid diluents, e.g., toluene, carbon tetrachloride, and the like, can be removed by passing a gas such as helium through the material, preferably with gently warming. Prior to this step, it may be desirable to flush the cast material at room temperature with additional organic liquid diluent. In this way, uncombined reactants and soluble low molecular weight polymers are removed. Additionally, other methods known in the art may be used to remove the inert organic liquid diluents, such as by the use of vacuum with or without gentle warming.

The invention is further illustrated by, but not limited to the following examples.

EXAMPLE 1

This example illustrates the use of reactants having NCO/OH = 1.00.

A solution of a polyol was prepared from 100 grams of a product resulting from the oxypropylation of diethylene-triamine, having a molecular weight of about 590, a hydroxyl number of about 480 and hydroxyl functionality of about 5.0 (hereinafter referred to as "LA-475") commercially available from Union Carbide Corporation, in 500 grams of toluene. A second solution of a polyisocyanate was prepared from 116 grams of a mixture of polyaryl polyalkylene polyisocyanates obtained by phosgenating the reaction product of aniline with formaldehyde, said mixture of organic polyisocyanates having the formula

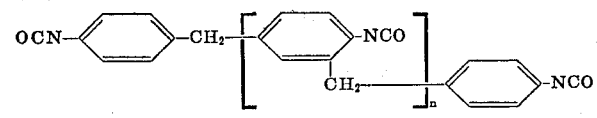

wherein $n$ has an average value of 0.5–2.0, containing about 40–50 percent diisocyanate, the balance being tri-, tetra- and pentaisocyanates, in this instance having a functionality of about 2.5 and an equivalent weight of about 131 (hereinafter referred to as "crude MDI"), in 500 grams of toluene. The two solutions were mixed, stirred for less than a minute until homogeneous and quickly poured into a mold, where the mixture stood quietly as polymerization proceeded. About four hours later the polyurethane produced was removed from the mold and stored overnight in a ventilated area while the toluene evaporated. The structure was found to have essentially 82 percent porosity, determined on an Air Comparison Pycnometer, Beckman Model 930. The density of the cured product was 0.24 grams per cubic centimeter.

The following examples illustrate the use of a range of concentration in toluene. The procedure of Example 1 was used, using the sme starting materials, wherein 100 grams of the polyol (LA-475) and 116 grams of the polyisocyanate (crude MDI) were dissolved separately in approximately equal amounts of toluene having a total weight as shown in the following table corresponding to concentrations of 12–25 percent polymer reactants in toluene. Thus, in Example 2, 100 grams of the polyol was dissolved in about 792 grams of toluene, and 116 grams of the polyisocyanate in about 792 grams of toluene. The ratio of NCO/OH is 1.00 for each combined mixture. The respective solutions were mixed and stirred for not over one minute until homogeneous, poured into a mold and left undisturbed. After about four hours the product was removed from the mold and dried by evaporation of the solvent. The properties of the products are tabulated as follows:

| Example | % Concn. Wt. | Toluene Total Weight g. | Properties of Product Density g./cc. | Porosity[1] |
|---|---|---|---|---|
| 2 | 12 | 1584 | 0.14 | 90 |
| 3 | 15 | 1224 | 0.18 | 86 |
| 4 | 17 | 1054 | 0.24 | 82 |
| 5 | 17.8 | 1000 | 0.24 | 81 |
| 6 | 18.5 | 952 | 0.24 | 81 |
| 7 | 20 | 864 | 0.27 | 81 |
| 8 | 25 | 649 | 0.38 | 75 |

[1]Porosity determined determined with a Beckman Model 930 Air Comparison Pycnometer.

The product of Example 3 showed a surface area of 0.5 square meters/gram by the Standard B-E-T method using nitrogen; the product of Example 7 showed 0.8 square meters/gram.

From examination of the above tabulation one skilled in the art could change readily the density and porosity of the resulting products to obtain an open-pore polyurethane structure having a porosity of at least 50 percent and a density of from 0.1 to 0.5 grams per cubic centimeter, by changing the weight percent solvent.

The open-pore polyurethane (OPU) was evaluated as a filter for tobacco smoke and compared with commercially used materials. The present material was cut to the appropriate size to replace the existing filter in commercial brands of cigarettes. Smoke from the burning tobacco was drawn through the filter at a constant rate of about 30–32 standard cubic feet per hour, and the effectiveness of each filter was determined from the increase in weight. For comparative purposes commercial cigarettes were subjected to the same test. The following tabulation shows the averaged results of the evaluations:

| Example | Filter Material | Density (g./cc.) | Weight Increase |
|---|---|---|---|
| 9 | Cellulose Fiber | 0.14–0.17 | 33.5 |
| 10 | OPU | 0.174 | 39.5 |
| 11 | OPU | 0.170 | 45.0 |
| 12 | OPU | 0.185 | 42.5 |
| 13 | Polyurethane Powder | ~0.33 | 23.2 |
| 14 | Cellulose Fiber | 0.17 | 27.5 |

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. As an example any number of solvents may be used in lieu of the toluene solutions described above. Flavorings or perfumes may be incorporated in the polyurethane to enhance the aesthetic quality of the filtered cigarette.

Fibrous fillers such as cellulose, and particulate fillers such as activated charcoal, carbon black, metal oxides and metallic powders can also be incorporated in OPU for possible enhancement or special filtering effects. The incorporation of metallic powders in the OPU has been previously described in our copending application Ser. No. 54,298 filed July 13, 1970, now U.S. Pat. No. 3,647,721. Furthermore, the OPU can be comminuted to granules and incorporated in a smoke filter between plugs to retain the granules. Accordingly, modifications are contemplated which can be made without departing from the spirit of the described invention.

What we calim is:

1. A smoke filter for tobacco products which comprises an open-pore polyurethane structure with a cross section corresponding to that of a tobacco smoke passage and having a porosity of at least 50 percent, a density of 0.1–0.5 grams per cubic centimeter, and further comprising coherent spherical particles of less than 10 microns diameter separated by interconnected interstices, said open-pore polyurethane being the reaction product of (1) a mixture of polyaryl polyalkylene polyisocyanates having the formula

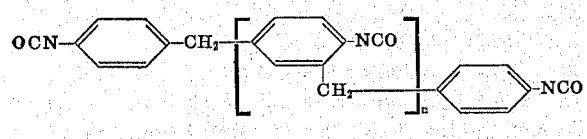

wherein $n$ has an average value of 0.5–2.0, containing about 40–50 percent diisocyanate, the balance being tri-, tetra- and pentaisocyanates, having a functionality of about 2.1–3.5, and (2) a polyol having a functionality of at least 3.0.

2. A smoke filter of claim 1 prepared by a method comprising the steps of
a. preparing separate solutions of polyurethane forming reactants in inert organic liquid diluents which are capable of forming a homogeneous mixture in which the polyurethane is substantially insoluble comprising:
1. a solution of a first inert organic liquid diluent and a mixture of polyaryl polyalkylene polyisocyanates having a functionality of about 2.1–3.5, and containing about 40–50 percent diisocyanate, the balance being tri-, and tetra-, and pentaisocyanates, said polyisocyanates having the formula

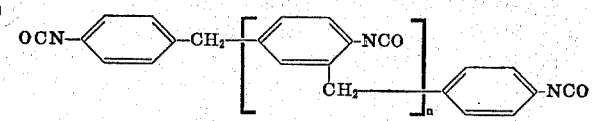

wherein $n$ has an average value of 0.5–2.0, and 2. a solution of a second inert organic liquid diluent and a polyol having a functionality of at least 3.0 selected from
   i. the reaction product of ethylene diamine and propylene oxide having a molecular weight of 275-300 and a hydroxyl number of about 750-800, and
   ii. the reaction product of diethylene triamine and propylene oxide having a molecular weight of 400-600 and a hydroxyl number of about 450-800;
b. mixing solutions (1) and (2) and making a homogeneous mixture of the reactants having a total concentration of weight of 10-30 percent and an NCO/OH ratio of 0.90-1.05 and ceasing said mixing before the onset of gelation;
c. thereafter maintaining the product of step (b) in a quiescent state while the polyurethane is precipitated; and
d. removing the inert organic liquid diluents; and
e. shaping the resulting product into the form of a smoke filter for tobacco products.

3. A smoke filter made by the method of claim 2 in which the polyol is an oxypropylated ethylenediamine having a molecular weight of about 275-300 and a hydroxyl number of about 750-800.

4. A smoke filter made by the method of claim 2 in which the polyol is an oxypropylated diethylenetriamine having a molecular weight of 400-600 and a hydroxyl number of about 450-800.

5. A smoke filter made by the process of claim 2 wherein said first and second inert organic liquid diluents are the same material.

6. A smoke filter of claim 1 prepared by a method comprising the steps of:
a. preparing a homogeneous liquid mixture of polyurethane-forming reactants having a total concentration by weight of 10-30% and an NCO/OH ratio of 0.90-1.05 in an inert organic liquid diluent in which the polyurethane is substantially insoluble, wherein the reactants comprise
   1. a mixture of polyaryl polyalkylene polyisocyanates having a functionality of about 2.1-3.5 and containing about 40-50 percent diisocyanate, the balance being tri-, tetra-, and pentaisocyanates, said polyisocyanates having the formula

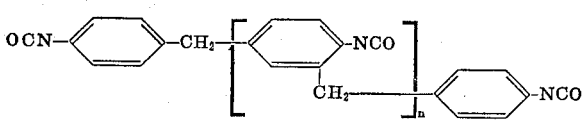

wherein $n$ has an average value of 0.5-2.0, and
   2. a polyol having a functionality of at least 3.0 selected from
      i. the reaction product of ethylene diamine and propylene oxide having a molecular weight of 275-300 and a hydroxyl number of 750-800, and
      ii. the reaction product of diethylenetriamine and propylene oxide having a molecular weight of 400-600 and a hydroxyl number of about 450-800;
   by mixing together said reactants and inert organic liquid diluent;
b. ceasing said mixing before the onset of gelation;
c. thereafter maintaining the product of step (a) in a quiescent state while the polyurethane is precipitated; and
d. removing the inert organic liquid diluent; and
e. shaping the resulting product into the form of a smoke filter for tobacco products.

7. A smoke filter of claim 1 which is a cylindrical rod.

8. A smoke filter of claim 1 which is comprised of comminuted granules of the open-pore polyurethane structure.

9. In a filter cigarette which comprises a hollow cylinder of paper, a filter in one end of the paper, and tobacco placed in the opposite end of the paper, the improvement which comprises a filter of the open-pore polyurethane structure of claim 1.

10. A method of filtering tobacco smoke which comprises drawing the smoke from the burning tobacco through an open-pore polyurethane structure having a porosity of at least 50 percent, a density of 0.1 to 0.5 grams per cubic centimeter, and further comprising coherent spherical particles of less than 10 microns diameter separated by interconnected interstices, said open-pore polyurethane being the reaction product of (1) a mixture of polyaryl polyalkylene polyisocyanates having the formula

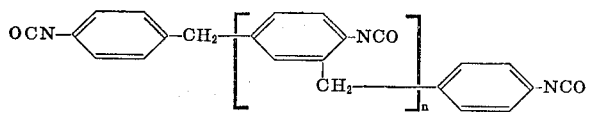

wherein $n$ has an average value of 0.5-2.0, containing about 40-50 percent diisocyanate, the balance being tri-, tetra- and pentaisocyanates, having a functionality of about 2.1-3.5, and (2) a polyol having a functionality of at least 3.0.

* * * * *